N. HOLDEN.
WIND-MILLS.
No. 195,131. Patented Sept. 11, 1877.
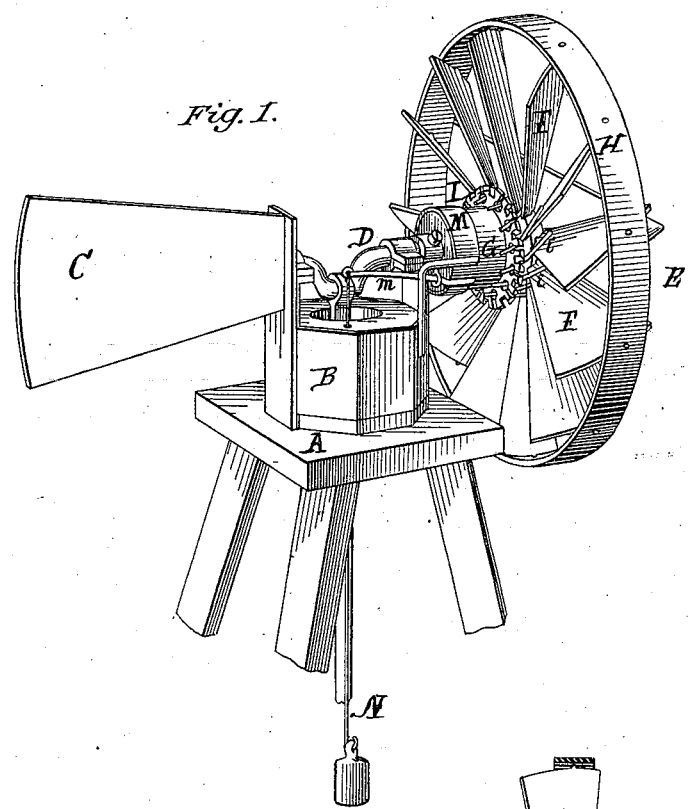
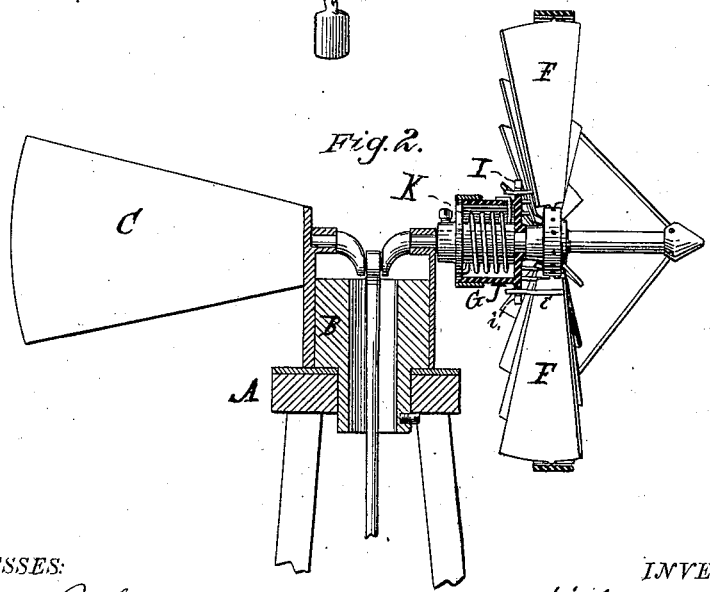
WITNESSES:
C. Clarence Poole
Geo. H. Evans
INVENTOR:
Nicholas Holden
per atty.
A. H. Evans & Co.

UNITED STATES PATENT OFFICE.

NICHOLAS HOLDEN, OF SAN JOSÉ, CALIFORNIA.

IMPROVEMENT IN WINDMILLS.

Specification forming part of Letters Patent No. 195,131, dated September 11, 1877; application filed August 3, 1877.

*To all whom it may concern:*

Be it known that I, NICHOLAS HOLDEN, of San José, in the county of Santa Clara and State of California, have invented certain new and useful Improvements in Windmills, of which the following is a clear, full, and exact description, reference being had to the accompanying drawings, forming a part of this specification, in which—

Figure 1 is a perspective view, and Fig. 2 a cross-section.

This invention relates to improvements in the class of windmills in which the vanes are automatically adjusted for regulating the speed of the wind-wheel in reference to the strength or velocity of the wind; and the invention consists in the combination and arrangement of parts, as will be hereinafter fully described.

In the drawing, A represents a frame for supporting the revolving hub B, upon which the wind-wheel is mounted. C represents the tail-vane. D represents the crank-shaft upon which the wind-wheel is mounted, and which shaft is journaled to the hub B. E represents the wind-wheel, and F the swinging vanes thereof. The ends of the vanes are pivoted to the inner hub G and outer ring H, so as to turn freely therein, according to the strength or velocity of the wind, and each of the vanes, near its lower end, is provided with an arm, e, which fits in the notches i of the disk I, secured to the drum J. K is a coiled spring, arranged around the shaft of the wind-wheel inside of the drum J. One end is secured to the inside of the drum J, and the other end to the shaft D. When the wind blows too strong it swings the vanes around straight or at right angles to the hub and ring G H, and as the strength or velocity of wind decreases the spring moves the vanes back to their proper angle. M is a spring-brake, operated by connecting-rod *m* and weighted lever N.

I do not desire to limit myself to a spring for automatically regulating the vanes of the wind-wheel, as a cord and weight could be substituted therefor, as desired, without departing from the spirit of my invention.

I do not desire to claim, broadly, a spring for automatically adjusting the vanes to the strength or velocity of the wind, as such is old; but,

Having thus described my invention, what I claim as new, and desire to secure by Letters Patent, is—

The combination, in a windmill, of the hub and ring G H, pivoted vanes F, provided with arms *e*, notched disk and drum I J, spring K, and shaft D, the several parts constructed and relatively arranged to operate substantially as herein shown and described.

NICHOLAS HOLDEN.

Witnesses:
CHARLES C. REDMOND,
J. H. CAMPBELL.